United States Patent [19]

Toreki et al.

[11] Patent Number: 5,278,110

[45] Date of Patent: Jan. 11, 1994

[54] SIC FIBERS HAVING LOW OXYGEN CONTENT AND METHODS OF PREPARATION

[75] Inventors: William Toreki; Christopher D. Batich, both of Gainesville, Fla.

[73] Assignee: University of Florida, Gainesville, Fla.

[21] Appl. No.: 26,638

[22] Filed: Mar. 5, 1993

Related U.S. Application Data

[62] Division of Ser. No. 886,805, May 22, 1992, which is a division of Ser. No. 774,017, Oct. 9, 1991, Pat. No. 5,171,722.

[51] Int. Cl.$^5$ ............................................. C04B 35/56
[52] U.S. Cl. ......................................... 501/88; 501/95
[58] Field of Search ..................... 501/88, 90, 95, 99; 423/345, 346, 347

[56] References Cited

U.S. PATENT DOCUMENTS 4,100,233  7/1978  Vajima et al. ..................... 423/345
5,063,107  11/1991  Birchall et al. ..................... 501/95
5,071,600  12/1991  Deleeuw et al. ..................... 501/95
5,139,871  8/1992  Wallace et al. ..................... 501/88

Primary Examiner—Mark L. Bell
Assistant Examiner—Paul Marcantoni
Attorney, Agent, or Firm—Kerkam, Stowell, Kondracki & Clarke

[57] ABSTRACT

A method of preparing preceramic SiC fibers having a very low oxygen content by forming fibers from a solution of a polycarbosilane and a vinylic sic precursor in a mutual volatile solvent, heating fibers in an oxygen-free inert s atmosphere to effect a cross-linking reaction therebetween. Also disclosed is a method of preparing SiC fibers having superior high temperature properties and a very low oxygen content comprising beating the above-described cross-linked preceramic fibers in an inert atmosphere substantially free of oxygen for a time and at a temperature sufficient to pyrolyze the cross-linked fibers to SiC fibers. The disclosure also describes the novel fibers produced by the above-described methods.

1 Claim, 7 Drawing Sheets

SIC FIBERS HAVING LOW OXYGEN CONTENT AND METHODS OF PREPARATION

BACKGROUND OF THE INVENTION

Research leading to completion of the invention was supported, in part, by Grant No. MDA 972-88-J-1006 issued by the Defense Advanced Research Projects Agency of the Department of Defense. The United States Government has certain rights to the invention described herein.

This is a division of application Ser. No. 07/886,805 filed May 22, 1992 which is a division of application Ser. No. 07/774,017 filed Oct. 9, 1991 (now U.S. Pat. No. 5,171,722 issued Dec. 15, 1992).

FIELD OF THE INVENTION

The present invention relates to preceramic polymeric fibers, ceramic fibers prepared therefrom and methods for their preparation.

THE PRIOR ART

Generally, in preparing a shaped ceramic article such as a fiber from a preceramic polymer by pyrolysis at elevated temperatures, it is necessary, prior to pyrolysis, to render the shaped article infusible. Otherwise, the shaped article will melt upon pyrolysis and thus the desired shape will be destroyed. The most common method of rendering the shaped article infusible has been an oxidation treatment. This method has the disadvantage of incorporating large amounts of oxygen in the resulting ceramic article. For example, standard grade Nicalon ® ceramic fibers, prepared from polycarbosilanes by Nippon Carbon Company Ltd., Tokyo, Japan, normally contain about 10-15 weight percent oxygen. High oxygen content results in decreased thermal stability of the ceramic materials at elevated temperatures.

Ceramic materials prepared from polycarbosilanes are known in the art. Verbeek et al in German Application Publication No. 2,236,078, which is hereby incorporated by reference, prepared ceramic materials by firing a polycarbosilane prepared by the pyrolysis of monosilanes at elevated temperatures in an inert atmosphere. Linear high molecular weight polymers such as polyethylene oxide, polyisobutylene, polymethylmethacrylate, polyisoprene and polystyrene were reported to improve the fiber spinning characteristics of the polycarbosilanes. The polycarbosilane fibers were rendered infusible prior to pyrolysis by either thermal oxidation, sulfidation or hydrolysis treatment. The ceramic fibers were reported to contain between 0 and 30 weight percent of oxygen, but no details were given.

Yajima et al in U.S. Pat. Nos. 4,052,430 (Oct. 4, 1977) and 4,100,233 (Jul 11, 1978), which are both hereby incorporated by reference, prepared ceramic materials by the pyrolysis of polycarbosilanes in an inert atmosphere or in a vacuum at an elevated temperature. The polycarbosilanes were prepared by thermally decomposing and polycondensing polysilanes. Polycarbosilane fibers were treated for 2–48 hours at 350°–800° C. under vacuum prior to pyrolysis to remove low molecular weight material. In some cases, the fibers were first exposed to an oxidizing atmosphere at 50°–400° C. to form an oxide layer on the fibers and then treated under vacuum at 350°–800° C. The oxygen content of the resulting ceramic fibers was not reported.

Yajima et al in U.S. Pat. Nos. 4,220,600 (Sep. 2, 1980) and 4,283,376 (Aug. 11, 1981), which are both hereby incorporated by reference, prepared ceramic materials by the pyrolysis of polycarbosilanes partly containing siloxane bonds at an elevated temperature under an inert atmosphere or a vacuum. These polycarbosilanes were prepared by heating polysilanes in the presence of about 0.01 to 15 weight percent of a polyborosiloxane in an inert atmosphere. Polycarbosilane fibers were rendered infusible prior to pyrolysis by either treatment with an oxidizing atmosphere at about 50°–400° C. to form an oxide layer on the fiber surface or by irradiation with gamma-rays or an electron beam under an oxidizing or non-oxidizing atmosphere. The oxygen content of the resulting ceramic fibers were in the range of 0.01 to 10 weight percent by chemical analysis. Oxygen in the form of silica could be further removed from the ceramic fiber by treatment in a hydrofluoric acid solution.

Iwai et al in U.S. Pat. No. 4,377,677 (Mar. 22, 1983), which is hereby incorporated by reference, also produced ceramic materials by the pyrolysis of polycarbosilanes at elevated temperatures under an inert atmosphere or vacuum. The polycarbosilanes of Iwai et al were prepared by heating a polysilane at 50°600° C. in an inert gas, distilling out a low molecular weight polycarbosilane fraction and then polymerizing the distilled fraction at 250°–500° C. in an inert atmosphere. Polycarbosilane fibers were rendered infusible prior to pyrolysis by heating at relatively low temperatures in air. The oxygen content of the resulting ceramic fibers was not reported.

Schilling et al in U.S. Pat. No. 4,414,403 (Nov. 8, 1983), which is hereby incorporated by reference, produced ceramic material by the pyrolysis of branched polycarbosilanes at elevated temperatures under an inert atmosphere or vacuum. The branched polycarbosilanes were prepared by reacting monosilanes with an active metal in an is inert solvent at elevated temperatures where at least some of the monosilanes contained vinyl groups or halomethyl groups capable of forming branching during the polymerization. Methods of rendering the material infusible were not discussed.

Yajima et al, *J. Mat. Sci.*, Vol. 13, p. 2569 (1978); Yajima, *Bull. Amer. Ceram. Soc.*, Vol. 62, p. 893 (1983); and Hasegawa et al, *J. Mat. Sci.*, Vol. 18, p. 3633 (1983) also discuss polycarbosilanes which are useful as preceramic polymers for preparing silicon carbide ceramics. In the *Bull. Amer. Ceram. Soc.* article, Yajima prepared ceramic fibers from polycarbosilanes which had been rendered infusible prior to pyrolysis by heating in air at 190° C. The resulting fibers contained 15.5 weight percent oxygen, most of which was thought to be incorporated into the fiber during the curing step.

Baney et al in U.S. Pat. No. 4,737,552 (Apr 12, 1988), which is hereby incorporated by reference, relates to a method of rendering a preceramic polycarbosilane composition infusible prior to pyrolysis by treating the preceramic polycarbosilane composition at a temperature of 150°–400° C. under an inert atmosphere or vacuum for a time sufficient to render the preceramic polycarbosilane composition infusible wherein the preceramic polycarbosilane composition contains (1) a polycarbosilane, (2) a hydrosilylation catalyst, and (3) an unsaturated compound selected from the group consisting of reactive alkynes, polyolefins, vinylsiloxane and unsaturated siloxanes. Baney et al also disclose a method of rendering preceramic polycarbosilane polymers infusible prior to pyrolysis by treating the preceramic polycarbosilane composition with a gas selected from the group consisting of reactive diolefins, reactive alkynes and vinylsilanes at a temperature of 150°–400° C. for a time sufficient to render the preceramic polycarbosilane composition infusible wherein the preceramic polycarbosilane composition contains (1) a polycarbosilane and (2) a hydrosilylation catalyst.

Seyferth et al in U.S. Pat. No. 4,719,273 (Jan. 12, 1988), the entire contents of which are incorporated herein by reference, describe a process of reacting a polycarbosilane with an organo-silicon compound having at least two alkenyl groups and then forming fibers from the reaction product.

Bujalski et al in U.S. Pat. No. 4,889,899 (Dec. 26, 1989), the entire contents of which are incorporated herein by reference, describe a method of preparing fibers employing a vinylic polysilane.

The use of polycarbosilane (PC) as a precursor to SiC fibers was first reported by Yajima et al in *Nature*, Vol. 261, p. 683 (1976). This method involved the synthesis of PC from a polydimethylsilane precursor. The PC was then spun into fibers and reacted with oxygen in order to cross-link the fibers and keep them from melting upon pyrolysis to ceramic. The oxygen treatment led to the presence of up to 20% $SiO_2$ in the final ceramic. This process is currently used by Nippon Carbon Company to produce Nicalon ® fibers. The polycarbosilane used in this process has a molecular weight of $\approx 1,500$ and is marketed by Dow Corning Corporation as a ceramic precursor. An oxidative treatment is required and an 80% yield of ceramic (containing 20% $SiO_2$) is obtained. Pyrolysis of unoxidized material results in a lower ($\approx 60\%$) ceramic yield. The presence of large amounts Of $SiO_2$ in the ceramic is known to have adverse effects on the mechanical properties at high temperatures. [see Hasegawa et al, *J. Mat. Sci.*, Vol. 211 p. 4352 (1986)]. One review of the properties of Nicalon ® fibers states that "[i]t seems clear that a fiber having a very low oxygen content would be desirable and this could only be achieved by changing the process of conversion to the precursor into the finished fiber." [Bunsell et al, *Composites Science and Technology*, Vol. 27, p. 157 (1986).] This has been accomplished to some degree by an electron beam cross-linking process; however, this is an expensive and complicated procedure [Okamura, *Composites*, Vol. 18, No. 2 (1987)]. Even though these fibers have serious drawbacks, they are considered to be state of the art and are currently enjoying widespread use in the area of composite materials.

It is an object of the present invention to provide novel SiC fibers having an extremely low oxygen content and superior high temperature mechanical properties to those produced according to present day methods.

It is another object of the invention to provide novel methods for the preparation of the above-described SiC fibers as well as intermediates therefor.

SUMMARY OF THE INVENTION

Figure 1:
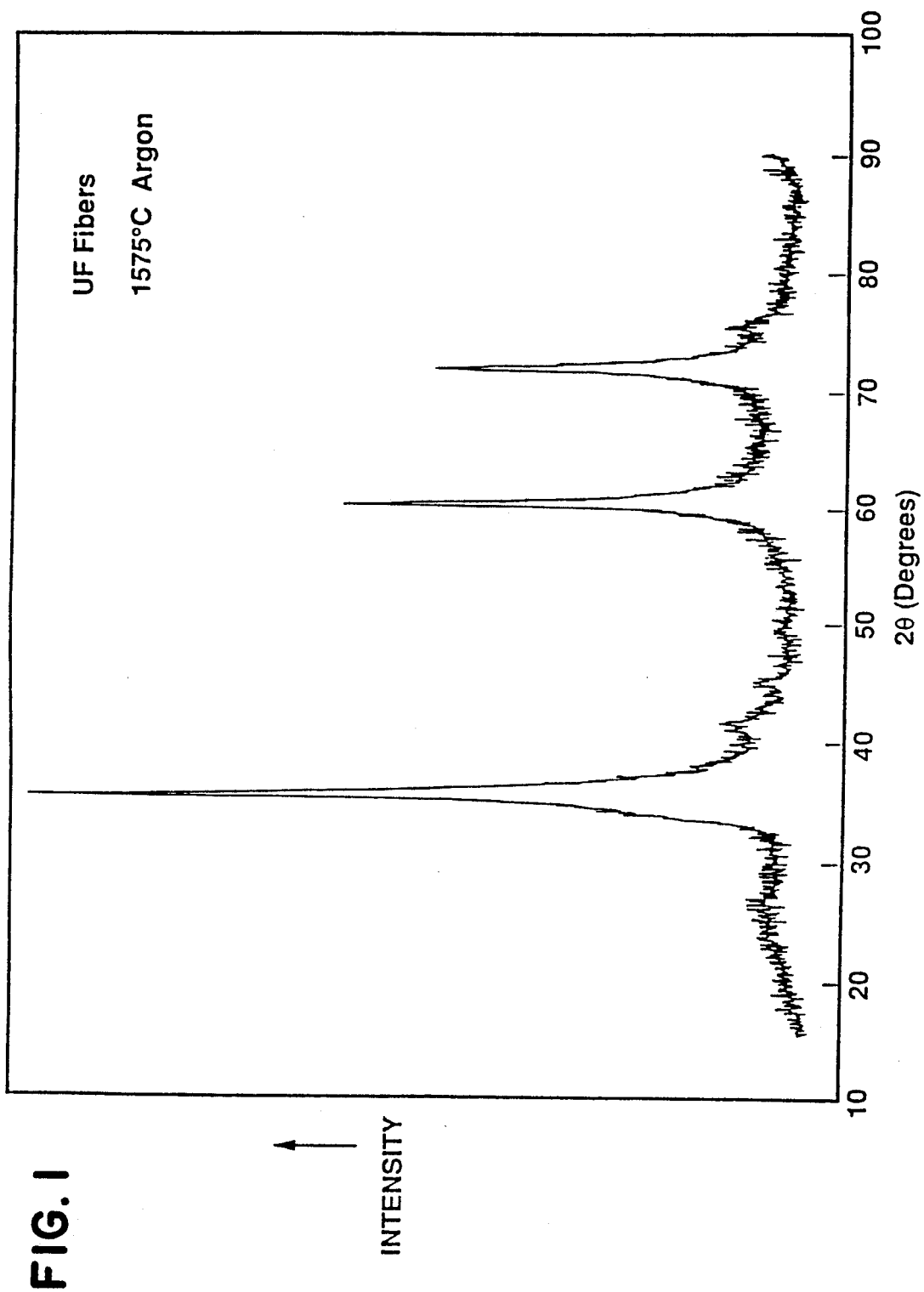
FIG. 1 is an X-ray diffraction pattern of fibers of the invention after heat treatment to 1,575° C. in argon.

The above and other objects are realized by the present invention which provides a method of preparing preceramic SiC fibers having a very low oxygen content comprising providing a solution of a polycarbosilane and a vinylic sic precursor in a mutual volatile solvent therefor, forming fibers from the solution, heating the fibers in an oxygen-free, inert atmosphere for a time and at a temperature sufficient to effect a cross-linking reaction between the polycarbosilane and the vinylic SiC precursor, the temperature being below that which results in pyrolysis of the cross-linked fibers, the vinylic SiC precursor:

a) being capable of yielding stoichiometric crystalline SiC upon pyrolysis;

b) having an oxygen content below about 1% by weight;

c) being compatible with the polycarbosilane in solution therewith such that no phase separation occurs;

d) being cross-linkable with the polycarbosilane as well as homo-cross-linkable; and e) contributing favorably to the processability and spinnability of the polymer mixture by affecting the viscoelastic behavior of the polymer solution and strength and flexibility of the spun fibers, the polycarbosilane possessing a combination of molecular weight and degree of branching sufficient to impart thereto the characteristic property that it does not melt at all, or just softens slightly when it is heated in an inert atmosphere to a temperature approaching that at which polycarbosilane begins to convert into a ceramic material (ca. 450° C.).

A further embodiment of the invention comprises a method of preparing SiC fibers having superior high temperature properties and a very low oxygen content comprising heating the cross-linked preceramic fibers described above in an inert atmosphere substantially free of oxygen for a time and at a temperature sufficient to pyrolyze the cross-linked fibers to SiC fibers.

Additional embodiments of the invention comprise the preceramic SiC fibers and the SiC fibers produced by the above-described methods.

DETAILED DESCRIPTION OF THE INVENTION

The present invention is predicated on the discovery that the formation of fibers from a mixture of a polycarbosilane (PC) and a vinylic SiC precursor having certain properties dissolved in a solvent and heating the fibers in an oxygen-free atmosphere results in the production of preceramic fibers which can be pyrolyzed in the absence of oxygen to yield SiC fibers having very little oxygen and mechanical properties at high temperatures, i.e., 1,400° C., which are vastly superior to Sic fibers currently available.

Although the above process is described as a two-stage mechanism, i.e., cross-linking followed by pyrolysis, those skilled in the art will appreciate that the method may be conducted as a one-step or a two-step method. Thus, the first heating step can be stopped after cross-linking has occurred and the cross-linked structure cooled and later pyrolyzed to produce the final product. Alternatively, and preferably, cross-linking and pyrolysis can be effected in one step by conducting a single heating step and sequentially cross-linking and pyrolyzing the article without interruption of the heating cycle.

The crux of the invention resides in the selection of the vinylic SiC precursor, i.e., a compound or polymer having vinylic unsaturation and capable of being pyrolyzed to produce SiC.

It is preferred to employ a polyvinylsilazane such as those described by Porte et al in U.S. Pat. No. 4,722,988 (Feb.2, 1988), the entire contents of which are incorporated herein by reference, or a polyvinylsilane such as those described by Bujalski et al [supra], the entire contents of which are incorporated herein by reference.

It will be understood by those skilled in the art, however, that any vinylic sic precursor which meets the criteria listed hereinabove may be utilized in the practice of the invention.

The polycarbosilane employed in the practice of the invention is most preferably one which (1) is completely soluble in the solvent used to prepare the fibers and (2) undergoes little or no melting when heated to a temperature approaching that at which the polymer starts to convert to a ceramic (approx. 450° C.).

A PC which softens only slightly when heated in an inert atmosphere is preferred to one which is completely infusible because of the greater ease of workability of concentrated solutions thereof and the superior mechanical properties of the SiC fibers prepared therefrom. It is also preferred to one which melts completely when heated because of better retention of the shape of the fibers during the pyrolysis. A PC which exhibits little or no melting when heated typically is one which has a significantly higher Kw than one which melts, although the melt behavior is not determined by the MW per se, but rather by the degree of branching of the molecule.

All of the spinning operations according to the invention are carried out at room temperature. The cross-linking occurs at approximately 125° C. The melting point of even a low KW PC is above 200° C. A slightly higher working temperature (60°-80° C.) could have engineering benefits in some cases, but this has nothing to do with the presence or absence of a melting point for the PC.

One of the keys to the success of the method of the invention is that the fibers maintain their shape during pyrolysis. High MW PC alone (without silazane) will do this, but the SiC fibers are brittle and the spinning is difficult; this is improved by using the silazane. A PC which "softens slightly" is converted by the silazane and dicumylperoxide into one which does not melt at all. Low KW PC (that which melts completely) is converted by the silazane and dicumylperoxide into one which "softens slightly" during pyrolysis and thus produces deformed fibers.

The vinylic SiC precursor imparts a plasticizing effect on the PC solution, facilitating the preparation and handling thereof, as well as the preparation of fibers therefrom. The free vinyl groups on the SiC precursor can react with the Si-H bonds on the PC, preferably in the presence of a hydrosilylation catalyst, and most preferably a free radical generator such as a peroxide, e.g., dicumylperoxide, di-t-butylperoxide, cumyl hydroperoxide, cumyl-t-butyl peroxide, 1,1-di-(t-butylperoxy)-3,5,5-trimethylcyclohexane, is 1,1-di-(t-butylperoxy)-cyclohexane, t-butylperoxybenzoate, benzoylperoxide and others, particularly those which are known to be effective hydrogen abstracters or those which generate very reactive radicals such as $CH_3$. This results in a more highly cross-linked polymer which better maintains its shape during pyrolysis to form the SiC ceramic fibers of higher strengths. The fact that the ceramic resulting from pyrolysis of the vinylic precursor remains amorphous in nature up to a very high temperature also contributes favorably to the high temperature stability of the SiC fibers.

Suitable solvents will depend on the nature of the vinylic SiC precursor and the PC. It is essential that the solvent be a good solvent for both materials and that they are compatible with each other in the solvent, i.e., no phase separation in solution occurs. Additionally, the solvent should be non-reactive with respect to the solutes, and be volatile enough to be completely removed from the fibers at a temperature below that used for cross-linking, preferably as they are spun, thus preventing the uncross-linked fibers from sticking together. This evaporation can be facilitated by conducting the spinning operation in a heated environment or by keeping the solution at an elevated temperature prior to spinning, if necessary. The temperatures should, however, be maintained below that at which the cross-linking reaction is starts to occur and below that temperature at which the polymers start to oxidize in the presence of air (around 100° C.).

Furthermore, solvents which contain oxygen are best avoided since small traces of solvent may remain trapped in the fibers and thus lead to higher oxygen contents in the pyrolyzed material. The best solvents are either aliphatic or aromatic hydrocarbons or halogenated hydrocarbons. Suitable solvents include: toluene, benzene, xylene, ethylbenzene, chlorobenzene, hexane, pentane, 150 mg, octane, cyclohexane, chloroform, methylene chloride; carbon disulfide and others.

Suitable concentrations of PC and vinylic Sic precursor in the solvent should be such as to enable the efficient formation of fibers. Generally, a solution containing from about 40% to about 90% total polymer by weight is appropriate for forming fibers according to conventional methods, e.g., dry spinning, wet spinning, extrusion and/or drawing from solution.

Preferably, the weight ratio of PC to vinylic SiC precursor should be in the range of from about 20:1 to about 1:2.

Generally, the formed fibers are heated to a temperature in the range of from about 25° to about 200° C. for a period of time of from about 0.5 hour to about 24 hours in order to fully cross-link the preceramic fiber. Generally, the cross-linked fibers are pyrolyzed by heating them under an inert atmosphere such as argon, nitrogen or a vacuum to a maximum temperature in the range of from about 600° C. to about 1,200° C. for a time of about 1 hour to about 6 hours in order to fully convert the polymer into a ceramic. Those skilled in the art will appreciate that the cross-linking and pyrolysis can be accomplished in a single heating step.

Alternatively, the cross-linked fibers can be pyrolyzed in a reactive atmosphere in order to impart a different chemical composition to the ceramic fibers. Pyrolysis in an ammonia atmosphere, for example, serves to reduce the relative amount of carbon in the samples while at the same time incorporating a substantial amount of nitrogen. In this manner, fibers containing varying amounts of silicon carbide and silicon nitride can be formed. Pyrolysis of preceramic polymers in an ammonia atmosphere has been described by Okamura et al in U.S. Pat. No. 4,916,093 (Apr. 10, 1990).

The invention is illustrated by the following non-limiting example.

EXAMPLE

The polycarbosilane used in the following example is described in U.S. Pat. Nos. 4,052,430 and/or 4,220,600, the entire contents of which are incorporated herein by reference. The material is a white powder at room temperature and is postulated to have a nominal structure as follows:

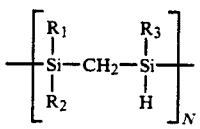

wherein $R_1$, $R_2$ and $R_3$=lower alkyl (preferably methyl) and/or hydrogen.

The polycarbosilane was synthesized by pressure pyrolysis of polydimethylsilane in a stainless steel autoclave under a nitrogen atmosphere. By varying the initial pressure of $N_2$ in the autoclave and the pyrolysis time and temperature, polycarbosilane with differing molecular weights, extents of branching, solubilities and melting behaviors can be obtained (see Table 1). The polycarbosilane was purified by dissolving the product in chloroform, filtering the solution and then precipitating the solid in a large excess of acetone followed by drying in a vacuum. The polymers were generally soluble in toluene, hexane, THF and chloroform. Molecular weights were determined by size-exclusion-chromatography in THF relative to polystyrene standards.

TABLE 1
RELATIONSHIP OF PC PROPERTIES TO SYNTHESIS CONDITIONS

| Time[a] | Temp[b] | Press[c] | MW[d] | Melting[e] | Ceramic Yield[f] |
|---|---|---|---|---|---|
| 1 | 450 | 1 | 1,000 | complete | 0 |
| 24 | 460 | 1 | 3,700 | foams | 65 |
| 20 | 480 | 1 | 5,000 | none | 82 |
| 24 | 510 | 1 | insoluble | none | 79 |
| 22 | 435 | 7 | 9,500 | foams slightly | 78 |

[a] pyrolysis time in hours
[b] pyrolysis temperature in °C.
[c] initial nitrogen pressure in autoclave
[d] molecular weight as determined by SEC
[e] behavior upon heating from 25° C. to approx. 500° C.
[f] percent of original solid remaining upon pyrolysis to 1,000° C. in nitrogen.

The polyvinylsilazane used in this experiment was prepared by refluxing a mixture of 1,3,5,7-tetravinyl-1,3,5,7-tetramethylcyclotetrasilazane (30 g), toluene (14 g) and dicumylperoxide (150 mg) for 18 hours under nitrogen and then removing the solvent and volatile portions at 100° C. on a rotary evaporator. The resulting polymer is a viscous liquid at room temperature and has a weight-average molecular weight of approximately 150,000. Note that if a substantially higher concentration of peroxide or a substantially lower concentration of toluene is used, then an insoluble gel will result. If 1% of dicumylperoxide is dissolved in the polyvinylsilazane and it is then heated above 115° C., a hard insoluble solid will be obtained. Pyrolysis of this solid to 1,000° C. in nitrogen results in a 67% yield of black ceramic material. The nature of this ceramic is discussed in two scientific papers [Toreki et al, Ceram. Eng. Sci. Proc., 11(9–10), p. 1371 (1990) and Toreki et al, Materials Letters, 11(1,2), p. 19 (1991), the entire contents of each being incorporated herein by reference.

A solution containing 3 g of polycarbosilane (MW 9,500- see Table 1), 0.4 g of polyvinylsilazane and 70 mg of dicumylperoxide in 12 ml of toluene was filtered through a 2–4 μm glass frit, and then a 0.20 μm PTFE filter, and then concentrated on a rotary evaporator until the solution contained approximately 30% solvent by weight.

The solution was transferred to a stainless steel fixture equipped with a spinnerette head containing three 74 μm diameter holes. The fixture was attached to a high pressure nitrogen cylinder. A pressure of approximately 350 psi was applied to the fixture. This caused the polymer solution to be forced through the three holes and exit the fixture in the form of fibers which were taken up on a 4-inch diameter rotating (120 rpm) aluminum drum placed 12 inches below the fixture. The spinning operation was conducted in the normal laboratory atmosphere at room temperature. Solvent evaporation from the fibers between the time they left the fixture and reached the drum was sufficient to dry the fibers to the point that they maintained their shape and did not stick together on the drum. When the spinning operation was complete, a single cut was made across the axis of the fibers and the fibers were removed from the drum. This resulted in a bundle of several thousand parallel fibers approximately 20–35 microns in diameter. The entire bundle was placed on a 12-inch long quartz combustion boat which was then placed inside a tube furnace. Under a slow nitrogen flow, the fibers were heated such that the temperature rose from room temperature to 150° C. during the course of 4 hours and then from 150° to 1,000° C. over the course of 4 additional hours. The furnace was then slowly cooled overnight. The pyrolyzed fibers were straight, shiny and black in appearance. The longitudinal shrinkage was approximately 30% and the weight loss was approximately 20%.

Analysis of the fibers by Scanning Electron Microscopy revealed that the fiber surfaces were smooth and that the diameters were in the range of 15–20 nm. The fibers generally had round or oval cross-sections. The fibers heated to 1,000° C. were amorphous in nature as determined by X-ray diffraction (XRD) and transmission electron microscopy (TEM). Heating to temperatures above 1,200° C., however, results in the formation of crystalline B-SiC. This is shown by the XRD spectrum of fibers treated at 1,575° C. in FIG. 1. Infrared spectroscopy, Scanning Auger Microprobe and neutron activation analysis indicate that the fibers have a very low oxygen content.

Figure 2:
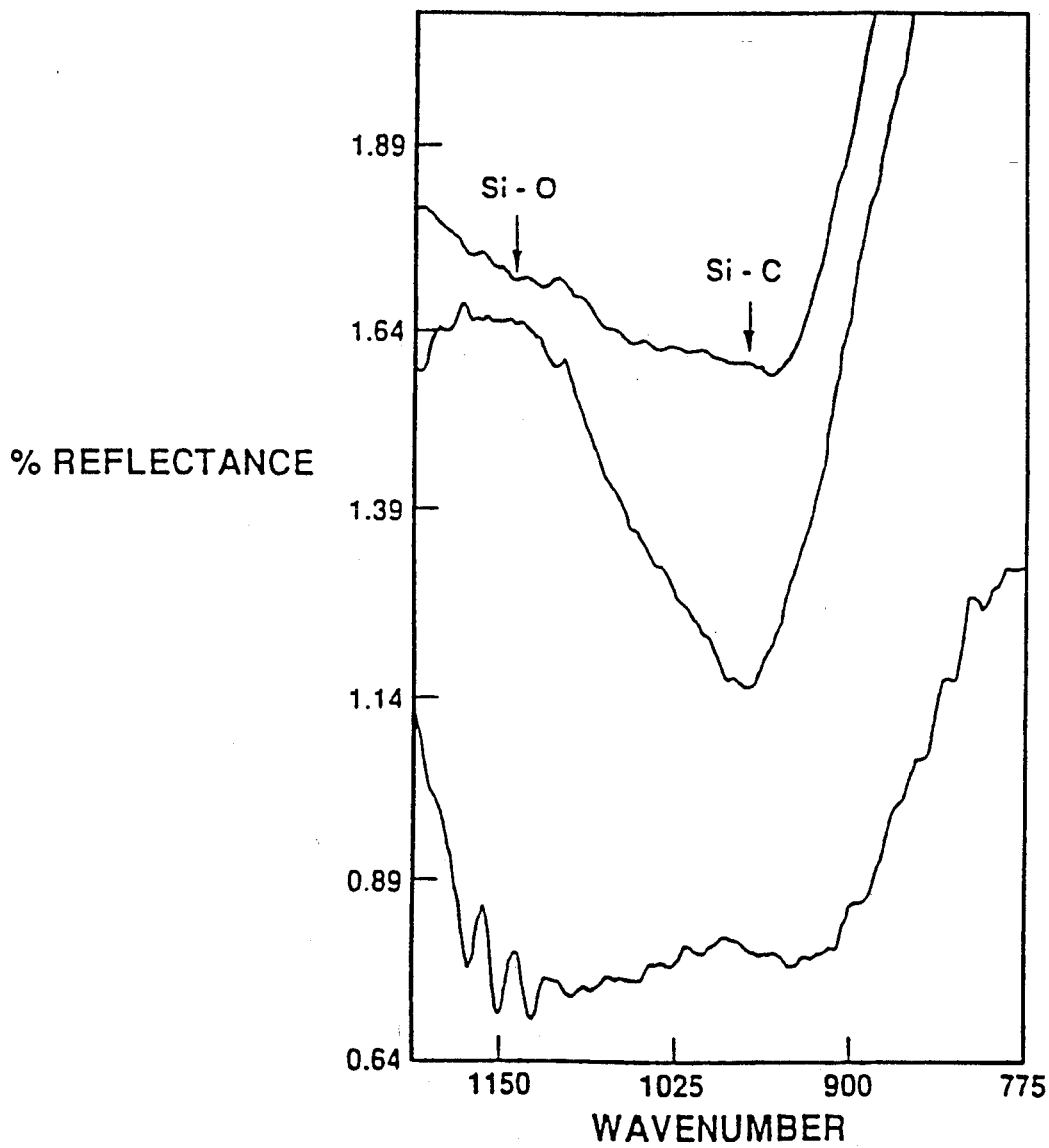
FIG. 2 is an FTIR comparison of the various fibers described herein.

A comparison of the FTIR spectra of the SiC fiber of the above example (with and without an oxidation treatment consisting of heating the uncross-linked fiber in air at 50° C. for 5 hours) [hereinafter referred to as the UF fiber] with that of the commercially available Nicalon ® fiber is set forth in FIG. 2. The results indicate significantly less is Si-O signal in the UF fiber than in the Nicalon ® fiber.

Figure 3:
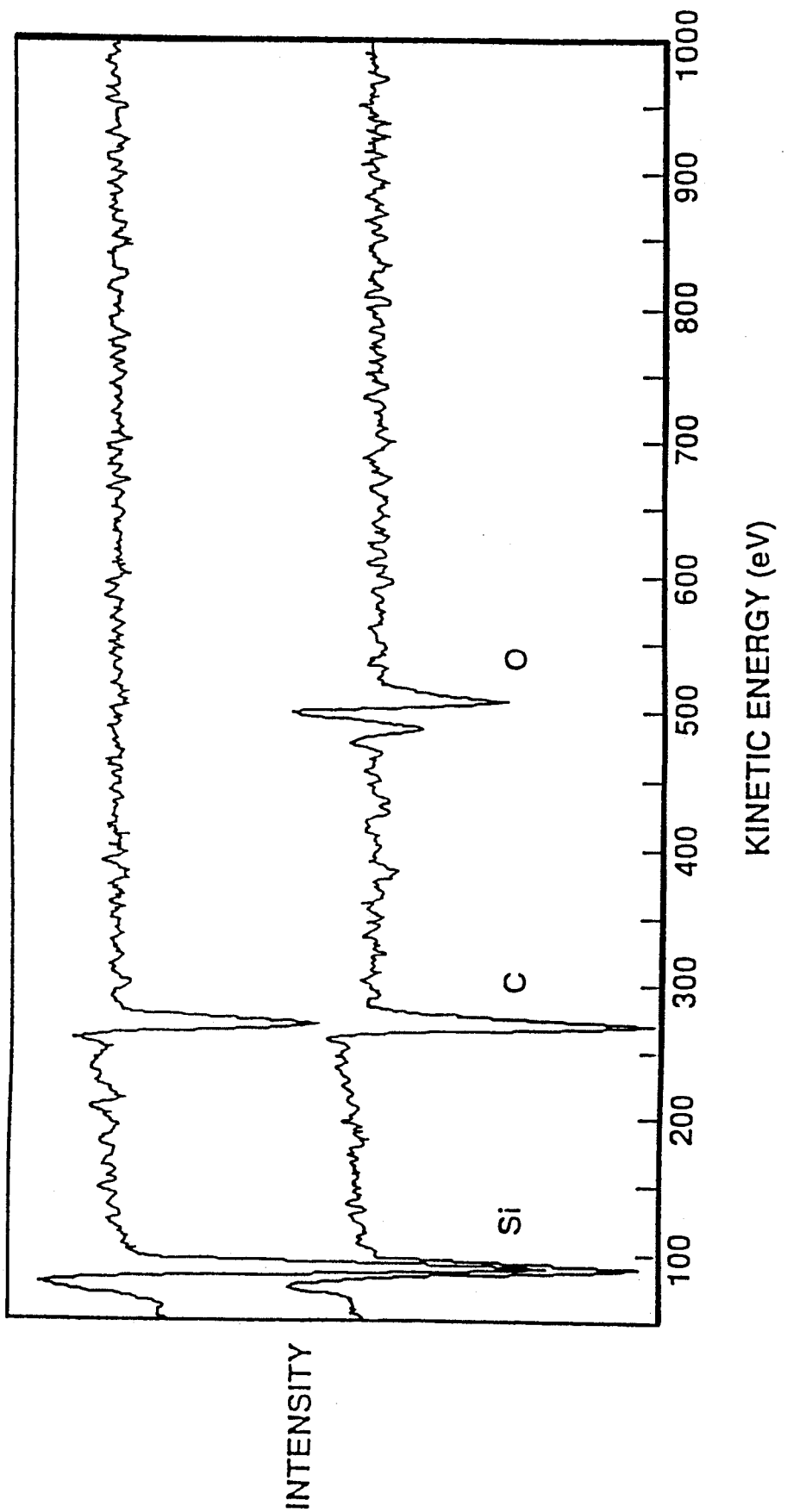
FIG. 3 is a Scanning Auger Microprobe spectra of the various fibers described herein.

The Scanning Auger Microprobe spectra of Nicalon ® and the UP fibers are compared in FIG. 3 where, again, the UF fiber demonstrates a dramatically lower oxygen content. In fact, an oxygen signal is not detected at all. The limit of detection of oxygen by this method is approximately 2% by weight. Note that the nitrogen content is also very low, but this is considered neither an advantage or a disadvantage.

Neutron activation analysis had established that the UF fibers of the above example have an oxygen content of 1.6% by weight. Analysis of Nicalon ® fibers by the same method indicates their oxygen content to be 15%.

Figure 4:
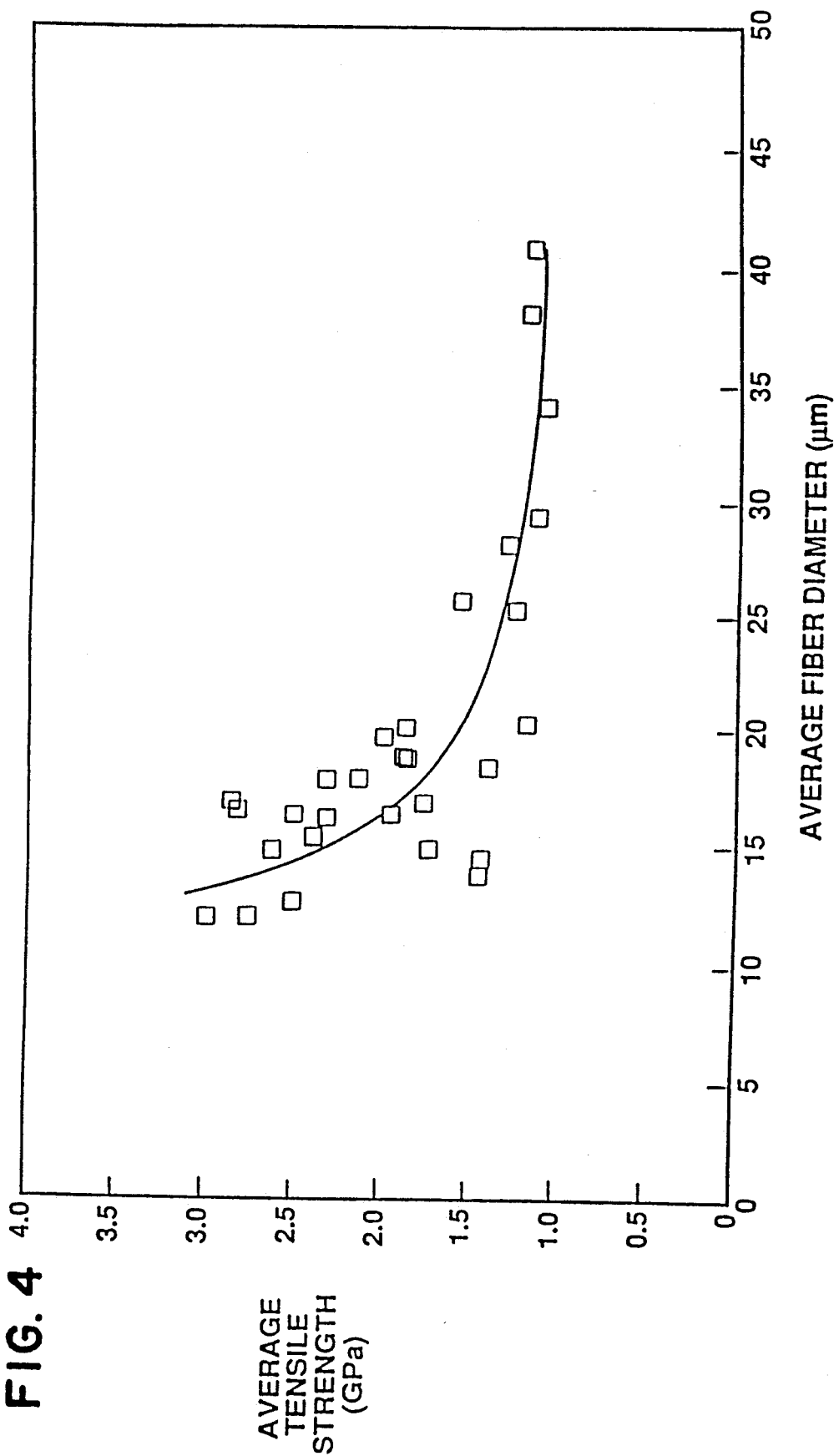
FIG. 4 is a graphical depiction of the tensile strength of various of the fibers described herein as a function of the fiber diameter.

Mechanical testing of the UF fibers have established that fibers with average tensile strengths greater than 2.5 GPa (360,000 psi) can be obtained for the 1,000° C. pyrolyzed fibers. Similarly, average elastic moduli of greater than 185 GPa ($2.6 \times 10^7$ psi) and average rupture strains of greater than 1.5% can be obtained. The tensile strengths of the UF fibers are seen to increase with decreasing fiber diameter, as shown graphically in FIG. 4.

Figure 5:
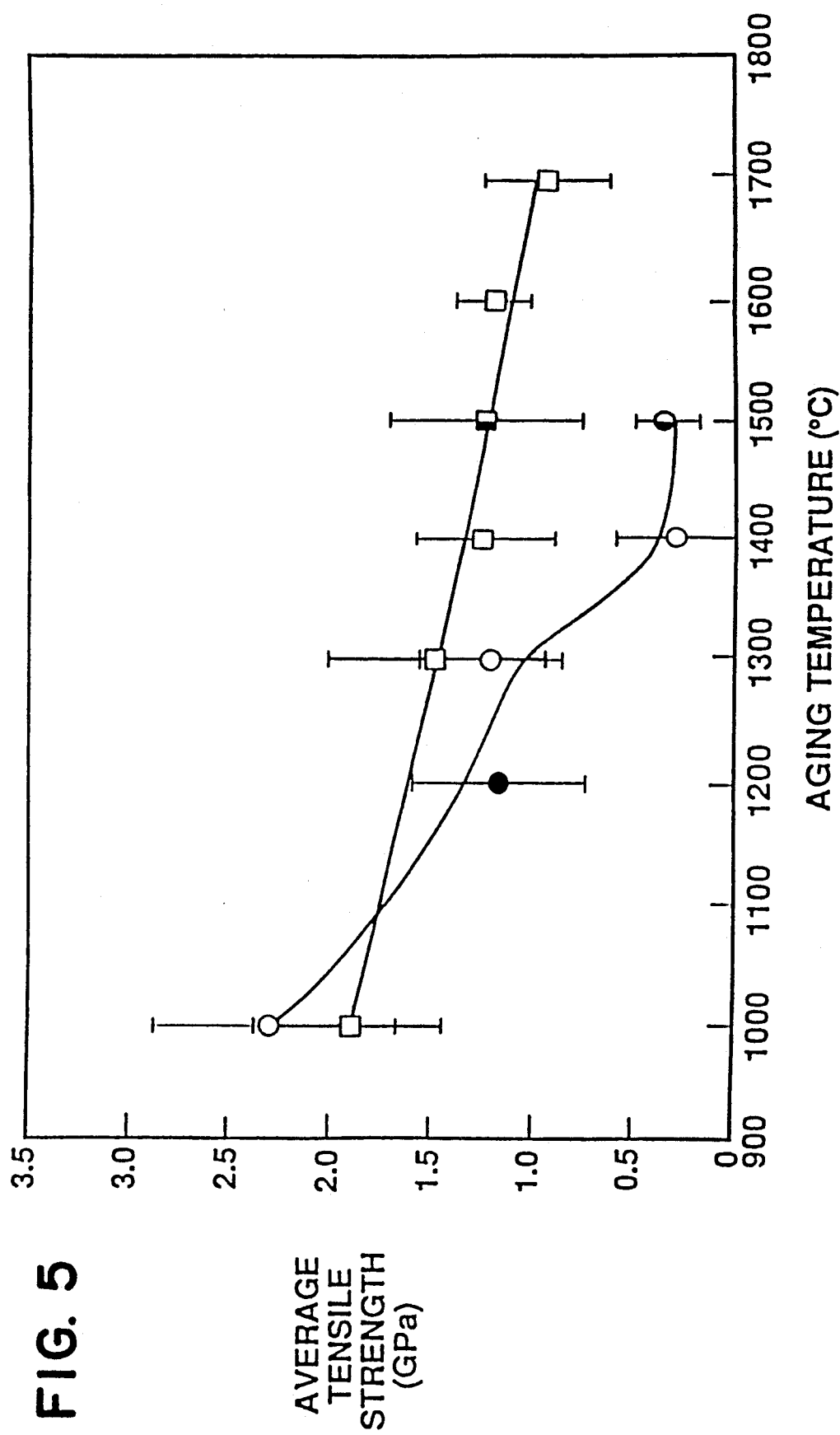
FIG. 5 depicts the variation of the tensile strength of various fibers described herein as a function of the heat treatment temperature.
Figure 6:
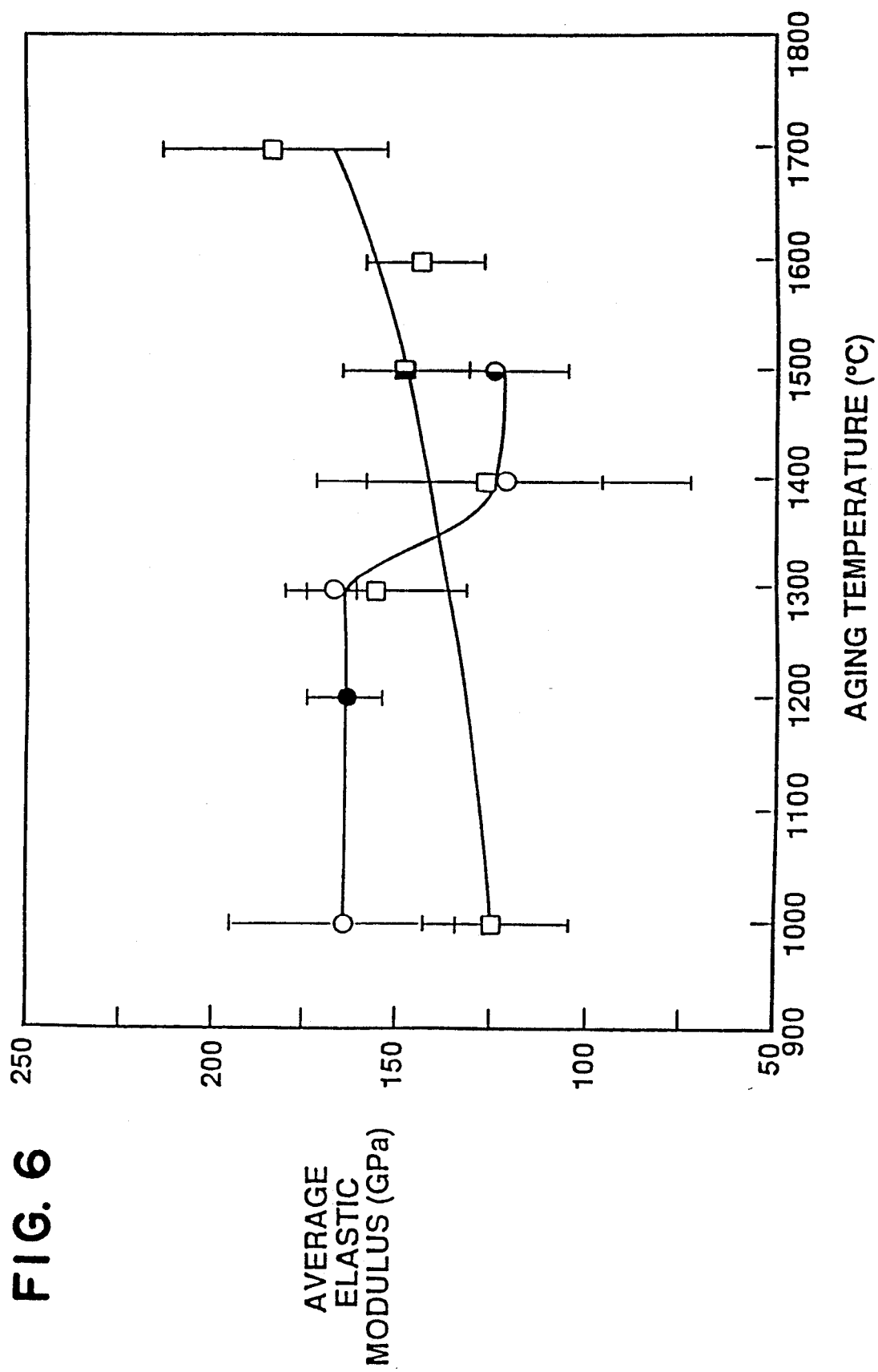
FIG. 6 depicts the variation of the elastic modulus is of various fibers described herein as a function of the heat treatment temperature.
Figure 7:
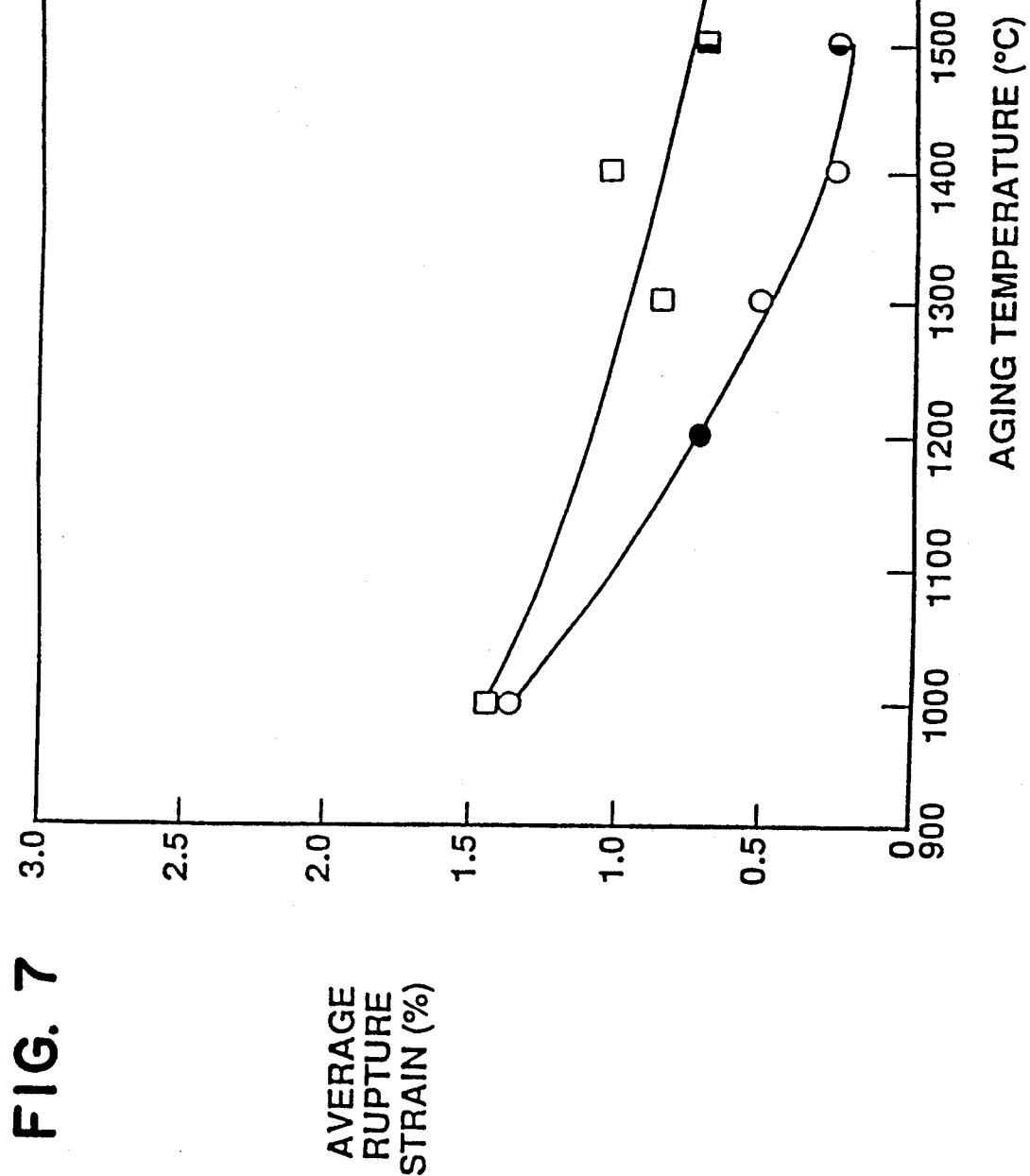
FIG. 7 depicts the variation of the rupture strain of various fibers described herein as a function of the heat treatment temperature.

In order to evaluate the retention of mechanical properties after exposure to high temperatures, both UF and Nicalon ® fibers were heated to various temperatures under inert atmospheres. After cooling to room temperature, the mechanical properties were re-evaluated. Comparisons of UF and Nicalon ® with respect to tensile strength, elastic modulus and rupture strain are shown graphically in FIGS. 5, 6 and 7. It can be seen that the lower oxygen content resulted in significantly better retention of properties after high temperature exposure for the UF fibers as compared to Nicalon ®.

The loss of strength of Nicalon ® fibers is known to be a direct result of the loss of oxygen-containing species as the fiber is heated above 1,200° C. Thermogravimetric analysis [M. Jaskowiak et al, *J. Am Cer. Soc.*, 72(2), p. 192 (1989)] indicates weight losses of in excess of 25% when Nicalon ® is heated to 1,500° C. in argon. TGA analysis of UF fibers show that upon heating to 1,575° C. in argon, the weight loss is only 2%.

The following factors affect the properties of the final ceramic fibers:

1. Polycarbosilane (PC) molecular weight and melting point
2. Polyvinylsilazane (PSZ) molecular weight
3. Ratio of PC to PSZ
4. Solvent content and composition
5. Catalyst content
6. Spinnerette diameter
7. Spinning pressure and temperature
8. Draw-down ratio (winding, speed and distance)
9. Pyrolysis time, temperature and atmosphere.

The nature of the cross-linking reaction is a hydrosilylation reaction between Si-H groups of the PC and vinyl groups of the PSZ. Any oxygen in these fibers is purely from incidental exposure; it is not a necessary part of the cross-linking process and can be avoided entirely through proper handling.

An additional benefit to this process is that the fibers are solution (dry) spun, rather than spun from the melt (as is the case with Nicalon ®). This, along with the complete elimination of an entire processing step, provides economic benefits during the manufacturing process.

The processing variables described above (#1, 2, 3, 4 and 7) can be varied in order to achieve a wide range of rheological properties for the precursor blend. This allows the system to be tailored in order to obtain optimum ease of spinnability for the available equipment, and is thus more versatile than the current (Nicalon ®) process.

We claim:

1. SiC fibers produced by heating cross-linked preceramic fibers in an inert atmosphere substantially free of oxygen for a time and at a temperature sufficient to pyrolyze said cross-linked preceramic fibers to SiC fibers having an oxygen content of less than 2% by weight, an average tensile strength of greater than about 2.5 GPa, an average elastic modulus of greater than about 185 GPa, an average rupture strain of greater than 1.5% and a weight loss on the order of about 2% by weight when said SiC fibers are re-heated to about 1,575° C. in argon; said cross-linked preceramic fibers having been produced by providing a solution of a polycarbosilane and a vinylic SiC precursor selected from the group consisting of a polyvinylsilazane, a polyvinylsilane and mixtures thereof in a mutual volatile solvent therefor, forming fibers from said solution, heating said fibers in an oxygen-free inert atmosphere for a time and at a temperature sufficient to effect a cross-linking reaction between said polycarbosilane and said vinylic SiC precursor, said temperature being below that which results in a pyrolysis of said cross-linked preceramic fiber, said vinylic SiC precursor:

a) being capable of yielding stoichiometric crystalline SiC upon pyrolysis;

b) having an oxygen content below about 1% by weight;

c) being compatible with said polycarbosilane in solution therewith such that no phase separation occurs;

d) being cross-linkable with said polycarbosilane as well as homo-cross-linkable; and e) contributing favorably to the processability and spinnability of the polymer mixture by affecting the viscoelastic behavior of the polymer solution and strength and flexibility of the spun fibers, the polycarbosilane possessing a combination of molecular weight and degree of branching sufficient to impart thereto the characteristic property that it does not melt at all, or just softens slightly when it is heated in an inert atmosphere to a temperature approaching that at which polycarbosilane begins to convert into a ceramic material.

* * * * *

UNITED STATES PATENT AND TRADEMARK OFFICE
CERTIFICATE OF CORRECTION

PATENT NO. : 5,278,110
DATED : January 11, 1994
INVENTOR(S) : William TOREKI, ET AL It is certified that error appears in the above-identified patent and that said Letters Patent is hereby corrected as shown below:

In the Abstract, line 3: "sic" should be -- SiC --.
(title page, [57]) line 5: delete "s".
line 8: change "beating" to -- heating --.

Column 2, line 23: "50°600°C." should be -- 50°-600°C. --.
line 38: delete "is".
line 54: "Apr" should be -- Apr. --.

Column 3, line 34: "Of" should be -- of --.
line 36: "see" should be -- See --; "211" should be -- 21 --.

Column 4, line 4: delete "is".
line 16: "sic" should be -- SiC --.
line 64: "Sic" should be -- SiC --.

Column 5, line 21: "sic" should be -- SiC --.
line 39: "Kw" should be -- MW --.
line 46: "KW" should be -- MW --.
line 58: "KW" should be -- MW --.

Column 6, line 3: delete "is".
line 30: delete "is".
line 40: delete "150 mg" and insert -- heptane --.
line 41: change ";" to -- , --.
line 42: change "Sic" to -- SiC --.

UNITED STATES PATENT AND TRADEMARK OFFICE
CERTIFICATE OF CORRECTION

PATENT NO. :     5,278,110

DATED      :     January 11, 1994

INVENTOR(S) :    William TOREKI, ET AL

It is certified that error appears in the above-identified patent and that said Letters Patent is hereby corrected as shown below:

Column 8, line 61:  "beating" should be -- heating --.
         line 62:  "50°C." should be -- 150°C. --.
         line 65:  delete "is".
         line 68:  "UP" should be -- UF --.

Column 10, line 12: after "(Nicalon®" insert -- ) --.

Signed and Sealed this

Seventh Day of June, 1994

Attest:

BRUCE LEHMAN

Attesting Officer    Commissioner of Patents and Trademarks